Sept. 23, 1941.  E. J. WADE  2,256,875
AUTOMATIC STEERING SYSTEM
Filed May 9, 1940
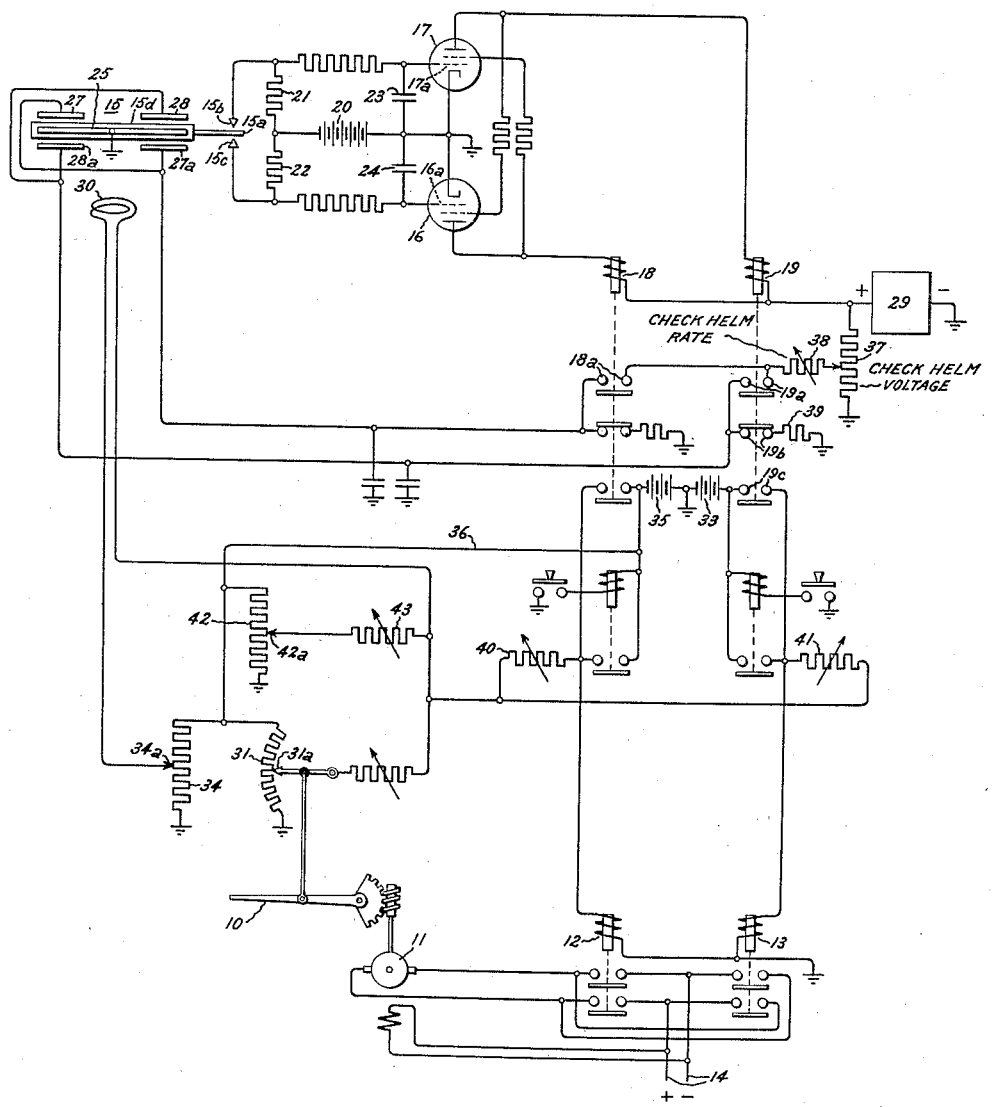
Inventor:
Elmer J. Wade,
by Harry E. Dunham
His Attorney.

Patented Sept. 23, 1941

2,256,875

UNITED STATES PATENT OFFICE 2,256,875

AUTOMATIC STEERING SYSTEM

Elmer J. Wade, Pittsfield, Mass., assignor to General Electric Company, a corporation of New York Application May 9, 1940, Serial No. 334,189

8 Claims. (Cl. 172—282)

This invention relates to automatic steering control systems for dirigible craft, and it has for an object the provision of a simple, reliable, inexpensive, and improved system of this character.

In carrying the invention into effect in one form thereof, suitable driving means are provided for moving the rudder of the craft and a compass is provided for effecting energization of the driving means in response to deviation of the craft from a predetermined course. Means are provided for influencing the compass with a magnetic field and this means is controlled by movement of the rudder to vary this magnetic field so that the compass tends to deenergize the driving means when the deflection of the rudder is in predetermined proportion to the deviation of the craft from the predetermined course. In addition electrostatic means are provided for influencing the compass with an electrostatic field to prevent the compass from deenergizing the driving means until the deflection of the rudder has been increased by an amount approximately proportional to the rate of deviation of the craft from its course.

For a better and more complete understanding of the invention, reference should now be had to the following specification and to the accompanying drawing, the single figure of which is a simple, diagrammatical sketch of an embodiment of the invention.

Referring now to the drawing, the rudder 10 of the craft upon which the steering system is mounted is driven by suitable driving means illustrated as an electric motor 11. Instead of an electric motor, any other suitable driving means might be used such, for example, as a power cylinder provided with a movable piston and connections to a source of pressure fluid. A pair of switching devices, illustrated as electromagnetically actuated contactors 12 and 13, is provided for connecting the rudder motor 11 to a source of supply which is represented by the two supply lines 14 for rotation in one direction or the other in response to deviation of the craft from its course as detected by a compass 15.

The compass assembly is provided with a movable contact 15a mounted on the compass magnet, and a pair of cooperating stationary contacts that are normally stationary but may be moved by means of a course setting device (not shown) to a position in azimuth such that when the craft is on the desired course the movable contact 15a occupies a position between the two contacts 15b and 15c, and not engaging either of them.

The compass 15 serves to energize one or the other of the amplifying electric valves 16 or 17 in response to deviation in one direction or the other, and these amplifying valves when energized supply current to the relays 18 and 19, respectively, and relays 18 and 19 control the energization of contactors 12 and 13, respectively.

Preferably the compass consists of a magnet 15d made of an alloy sold on the market under the trademark Alnico. The magnet is pivotally mounted for rotation in sapphire jewel bearings (not shown) and may have an oscillation frequency of approximately 18 complete swings per minute. The lower end of the pivot of the magnet rests in an oil dashpot (not shown) which makes the motion aperiodic.

A negative potential is impressed on the grids 16a and 17a of valves 16 and 17 from a suitable voltage source illustrated as a battery 20. This negative grid voltage is of sufficient magnitude to bias the valves to cut off. Resistors 21 and 22 are connected in circuit between the source 20 and contacts 15b and 15c, respectively, and are of such ohmic resistance as to limit the current that is carried and broken by the contacts to a low value, e. g. two microamperes. Capacitors 23 and 24 are respectively connected in parallel with the contacts for the purpose of effectually eliminating sparking at the contacts.

In addition to the compass magnet, there is also mounted on the pivots a very light plate 25 which moves with respect to fixed insulated plates 27, 27a, 28 and 28a. These fixed plates are energized from the source of supply 29 when one or the other of relays 18 and 19 is picked up, and exert an electrostatic pull on the movable plate 25 for supplying check helm corrections.

The magnet is also influenced by the magnetic field of a bias coil 30, the current in which is varied by a potentiometer resistor 31 which is actuated by the motion of the rudder. This bias coil supplies a magnetic flux at right angles to the horizontal component of the earth's magnetic field and the magnitude of this flux is proportional to the deflection of the rudder.

With the foregoing understanding of the elements and their organization in the system, the operation of the system itself will readily be understood from the following description.

Assume a deviation of the craft from its course in such a direction that contacts 15a and 15b are closed. As a result, the negative bias voltage is removed from the grid 17a of amplifier valve 17 and the valve becomes conducting and current flows from the positive terminal of source 29 through the operating coil of relay 19 to the anode of valve 17, thence to the cathode and to ground to which the negative terminal of source 29 is connected. Relay 19 picks up in response to energization and closes its contacts 19a and 19c and opens contacts 19b. Contacts 19c in closing complete a circuit for the operating coil of contactor 13 which is traced from the positive terminal of battery 33, through contacts 19c, coil of contactor 13 to ground which is connected to negative terminal of battery 33. Contactor 13 picks up and connects rudder motor 11 to source 14 for rotation in a direction that will move rudder 10 in a direction to oppose the deviation.

Potentiometers 31 and 34 constitute a bridge that is energized from battery 35. The circuit is traced from the negative terminal of battery 35 by conductor 36, resistors 31 and 34 in parallel to ground and the negative terminal of the battery. The terminals of bias coil 30 are connected to movable contacts 31a and 34a which occupy equipotential points on the resistors 31 and 34 when the rudder is in its central or null position.

Movement of the rudder 10 by motor 11 effects a movement of contact 31a which may be assumed to be downward. As a result the bridge is unbalanced and a current is supplied from the bridge to the bias coil 30 that is proportional to the deflection of rudder 10. The direction of the flux of bias coil 30 is such as to tend to cause the contacts 15a, 15b to open. Of course the contacts do not open immediately because the deviation will continue to increase and this tends to keep the contacts closed.

The closing of contacts 19a connects the deflecting plates 28, 28a to the source 29 so that a voltage is applied to charge these plates and the plate 25. The direction of the force produced by the electrostatic pull of these plates is in such a direction as to oppose the force produced by the flux of the bias coil 30.

Thus when the compass contacts close as a result of a deviation of the craft from its course, two forces start to act on the compass magnet in addition to the earth's field. One force is the magnetic pull of the bias coil which increases at a linear rate due to the movement of the rudder, and the other is the force of the deflecting plates which increases exponentially with time at an initial rate which depends upon the settings of the "check helm voltage" potentiometer 37 and of the "check helm" rate adjustable resistor 38. The charge on these plates and the resultant electrostatic pull reaches a maximum value dependent upon the setting of the "check helm voltage" potentiometer 37.

When the algebraic sum of these two forces produces a moment which is equal and opposite to that of the earth's field, the contacts will open. As a result the valve 17 becomes non-conducting and relay 19 and contactor 13 drop out and disconnect rudder motor 11 from the source. The opening of contacts 19a disconnects the deflecting plates from source 29, and the closing of contacts 19b connects these plates to ground through discharge resistor 39. On account of the stopping of the rudder the force of the bias coil will cease to increase. Also the deflecting plate force will cease to increase and start to decrease exponentially at a very slow rate.

If the check helm voltage potentiometer 37 had been set at zero, then the bias coil current would have acted alone to separate the compass contacts and the rudder deflection would have been proportional and opposite to the angle of deviation.

The purpose of the deflection plates is to supply a correction in the rudder position which will prevent an oscillation of the craft with respect to the course as an axis, that is to say, the purpose of the deflecting plates is to prevent steering a zigzag course. In order to prevent such oscillation it is necessary for the rudder to return to the neutral or null position slightly before the craft returns to the desired course. Under some conditions it may be necessary for the rudder to pass beyond the neutral position. The deflecting plates supply a correction which is approximately equal to the rate or velocity of deviation from the course. The correcting force produced by these plates varies exponentially as a function of the time during which the rudder moves from its neutral position in correcting for the deviation, and since the rudder moves at a uniform rate, the maximum angle of deflection may be taken as an approximate measure of the amount of velocity correction required.

While the deviation of the craft from the course is increasing, the force of the deflection plates is opposite to the force of the bias coil and consequently an additional rudder movement is necessary to cause the compass to open its contacts.

This rudder movement checks the deviation and after a small amount of the charge on plates 28, 28a has leaked off through resistor 39, contacts 15c and 15a close. This results in rendering valve 16 conducting which in turn causes the relay 18 and contactor 12 to pick up. Contactor 12 in closing connects rudder motor 11 to the source for rotation in the opposite direction. Contacts 18a in closing connect deflection plates 27, 27a to the source 29. Consequently the forces of all the deflecting plates on the compass tend to equalize or to reverse but the direction of the force of the bias coil remains the same. In other words, when the deviation is decreasing the forces of the bias coil and the deflecting plates are in the same direction and this results in a smaller rudder angle for a given deviation of the craft from the course. As a result of this, the rudder arrives at its null position before the craft returns to its course. If the craft returns exactly to its course and does not swing past the course, the contact 15a will occupy a position between the two contacts 15b and 15c and the steering system will remain inactive until there is a new deviation of the craft from its course. If the craft returns toward the course at too rapid a rate, the contacts 15a and 15c will close before the craft reaches the true heading and the system will operate in the manner described in the foregoing to move the rudder in the opposite direction from neutral and thus check the return swing so that the return swing ceases as the craft reaches the desired heading. On the other hand, if the return swing stops short of the desired course, the operation described in the foregoing will be repeated until the craft is returned to its course.

In the foregoing description it has been assumed that the linkage between the compass contacts and the rudder acted instantaneously, i. e., that the rudder started and stopped instantly as the compass contacts closed and opened. Actually, this is not true because there is a delay of a fraction of a second on account of the time lag of the relays and contactors and the time constant of the motor circuit. This delay results in a slight movement of the rudder, and a consequent change in the bias coil current after the contacts open. The amount of this movement varies directly with the rudder speed and results in the rudder stopping at a value which is too high or too low and causes the movable compass contact to swing across to the other side and engage the other stationary contact. This would result in continuous movement or hunting of the rudder which is undesirable.

In order to compensate for this time lag, adjustable resistors 40 and 41 are provided which are included in connections which are completed between one or the other of the batteries 35 and 33 and the bias coil when one or the other of the relays 18 or 19 is closed. The direction of current flow through the active resistor and the bias coil is in such a direction as to tend to open the contact on the compass magnet. Since this current disappears as soon as the compass contact opens, it can be adjusted for any given rudder speed so that the contacts open slightly sooner than they otherwise would and the further movement of the rudder occasioned by time lag brings the bias coil current to just the right value so that the movable contact 15a remains in the open position between contacts 15b and 15c until closed again by a change in the deviation.

A conning control is provided for the purpose of quickly changing the course by a predetermined amount to avoid obstructions. This control is illustrated as comprising a potentiometer resistor 42 connected in parallel with the bridge potentiometers 31 and 34 and provided with a movable contact 42a which is connected through an adjustable resistor 43 to one terminal of the bias coil 30. When movable contact 42a occupies a position on potentiometer resistor 42 corresponding to the position of contact 34a on potentiometer resistor 34, no current flows through resistor 43 to the coil 30. Contact 42a may be provided with a control handle which snaps into a notch at the zero current point for the purpose of facilitating regaining the course after having avoided the obstruction.

The amount by which the course can be changed is limited to a suitable value such as 30 degrees within which the compass keeps control.

Although in accordance with the provisions of the Patent Statutes, this invention is described as embodied in concrete form and the principle thereof has been explained together with the best mode in which it is now contemplated applying that principle, it will be understood that the elements and connections shown are merely illustrative and that the invention is not limited thereto, since alterations and modifications will readily suggest themselves to persons skilled in the art without departing from the true spirit of the invention or from the scope of the annexed claims.

What I claim as new and desire to secure by Letters Patent of the United States is:

1. An automatic steering system for dirigible craft comprising a rudder, driving means for moving said rudder, a compass for energizing said driving means in response to a deviation of said craft from a predetermined course, means controlled by movement of said rudder for influencing said compass with a magnetic flux which tends to cause said compass to deenergize said driving means when the deflection of said rudder is in predetermined proportion to said deviation, and means for influencing said compass with an additional force which prevents said compass from deenergizing said driving means until said rudder has been deflected an additional amount approximately proportional to the rate of deviation of said craft from said course.

2. An automatic steering system for dirigible craft comprising a rudder, driving means for moving said rudder, a compass for energizing said driving means in response to a deviation of said craft from a predetermined course, means controlled by movement of said rudder for influencing said compass with a magnetic flux which tends to cause said compass to deenergize said driving means when the deflection of said rudder is in predetermined proportion to said deviation, and means for influencing said compass with an electrostatic field to prevent said compass from deenergizing said driving means until said rudder has been deflected an additional amount approximately proportional to the rate of deviation of said craft from said course.

3. An automatic steering system for dirigible craft comprising a rudder, driving means for moving said rudder, a compass for energizing said driving means in response to a deviation of said craft from a predetermined course, a coil mounted in cooperative relationship with said compass so as to influence said compass with a magnetic flux substantially perpendicular to the horizontal component of the earth's magnetic field to cause said compass to deenergize said driving means when the deflection of said rudder is in predetermined proportion to said deviation, and means for influencing said compass with an electrostatic field to prevent said compass from deenergizing said driving means until said rudder has been deflected an additional amount approximately proportional to the rate of deviation of said craft from said course.

4. An automatic steering system for dirigible craft comprising in combination, a rudder, driving means for said rudder, a compass for energizing said driving means in response to a deviation of said craft from a predetermined course, means for influencing said compass with a component of magnetism which tends to cause said compass to deenergize said driving means when the deflection of said rudder is in predetermined proportion to said deviation comprising a coil mounted in cooperative relationship with said compass and means actuated by said driving means for varying the energization of said coil, and means responsive to an increasing deviation for supplying an electrostatic field which influences said compass in opposition to the influence of said coil and responsive to a decreasing deviation for influencing said compass with an electrostatic field in the same direction as the magnetism of said coil thereby to prevent said compass from deenergizing said driving means when said deviation is increasing until the deflection of said rudder has been increased an amount approximately proportional to the rate of deviation of said craft from said course and for preventing said compass from deenergizing said driving means when said deviation is decreasing until the deflection of said rudder has been decreased an amount approximately proportional to the rate of said deviation.

5. An automatic steering system for dirigible craft comprising in combination, a rudder, driving means for moving said rudder, a magnetic compass and means controlled thereby for energizing said driving means in response to deviation of said craft from a predetermined course, a coil mounted with its axis substantially perpendicular to the magnetic axis of the magnet of said compass for influencing said compass with a magnetic flux, means actuated by said driving means for varying the energization of said coil thereby to cause said compass to tend to deenergize said driving means when the deflection of said rudder is in predetermined proportion to the deviation of said craft from a predetermined course, and means for influencing said compass magnet with an electrostatic field which prevents said compass from deenergizing said driving means when said deviation is increasing until the deflection of said rudder has been increased by an amount approximately proportional to the rate of said deviation and which prevents said compass from deenergizing said driving means until said deflection has been decreased by an amount approximately proportional to the rate of said deviation when said deviation is decreasing comprising a pair of electrostatic plates mounted to move with said compass magnet and relatively stationary plates mounted in cooperative relationship with said movably mounted plates, and means controlled by said compass for supplying a voltage to said plates.

6. An automatic steering system for dirigible craft comprising in combination, a rudder, driving means for moving said rudder, means responsive to deviation of said craft from a predetermined course for energizing said driving means to move said rudder in one or the other direction from its neutral position comprising a pair of contacts for controlling said driving means, a magnetic compass provided with a contact for engaging one or the other of said pair of contacts depending upon the direction of said deviation from said course, means tending to separate the engaged contacts when said rudder is deflected an amount proportional to said deviation comprising a coil mounted in cooperative relationship with said compass with its axis substantially at right angles with the horizontal component of the earth's magnetic field and means actuated by said driving means for varying the energization of said coil, and electrostatic means for opposing the influence of said coil thereby to prevent the separation of said engaged contacts until the deflection of said rudder has been increased by an amount approximately proportional to the rate of said deviation.

7. An automatic steering system for dirigible craft comprising in combination, a rudder, driving means for moving said rudder, a compass responsive to deviation of said craft from a predetermined course for energizing said driving means for operation in a direction corresponding to the direction of said deviation from said course, means for causing said compass to tend to deenergize said driving means when the amount of deflection of said rudder is in predetermined proportion to said deviation comprising a coil arranged in cooperative relationship with said compass and means actuated by said driving means for varying the energization of said coil, and means for compensating for the time lag between the operation of said compass to deenergize said driving means and the stopping thereof thereby to prevent said coil from causing said compass to energize said driving means in the reverse direction as a result of the continued movement of said driving means after said operation of said compass.

8. An automatic steering system for dirigible craft comprising a rudder, driving means for said rudder, a compass responsive to deviation of said craft from a predetermined course for energizing said driving means for operation in a direction corresponding to the direction of said deviation from said course, a coil arranged to influence said compass to tend to cause said compass to deenergize said driving means, means actuated by said driving means for varying the excitation of said coil so as to cause said compass to tend to deenergize said driving means when the deflection of said rudder is in predetermined proportion to said deviation, and means for compensating for the time delay between the operation of said compass to deenergize said driving means and the stopping thereof comprising means controlled by said compass for supplying a component of current to said coil when said driving means is energized and for interrupting the supply of said current component in response to operation of said compass to deenergize said driving means thereby to prevent said coil from causing said compass to energize said driving means in the reverse direction as a result of the movement of said driving means during said time delay.

ELMER J. WADE.